(12) United States Patent
Ferguson et al.

(10) Patent No.: US 10,131,445 B2
(45) Date of Patent: Nov. 20, 2018

(54) CONTAINMENT SYSTEM AND INCREASED STRENGTH RADOME ASSEMBLY

(71) Applicant: ASTRONICS AEROSAT CORPORATION, Amherst, NH (US)

(72) Inventors: Dennis E. Ferguson, Georgetown, TX (US); Joseph A. Hoell, Jr., Dunbarton, NH (US); Grant A. Dillon, Concord, NH (US); Frank J. Blanda, Nashua, NH (US); David E. Kopf, Westford, MA (US); Bruce D. Kelly, Exeter, NH (US); William S. McNary, Amherst, NH (US); Matthew N. Landel, Milford, NH (US)

(73) Assignee: ASTRONICS AEROSAT CORPORATION, Manchester, NH (US)

( * ) Notice: Subject to any disclaimer, the term of this patent is extended or adjusted under 35 U.S.C. 154(b) by 111 days.

(21) Appl. No.: 14/590,670

(22) Filed: Jan. 6, 2015

(65) Prior Publication Data
US 2015/0191256 A1  Jul. 9, 2015

Related U.S. Application Data

(60) Provisional application No. 62/037,529, filed on Aug. 14, 2014, provisional application No. 61/924,025, filed on Jan. 6, 2014.

(51) Int. Cl.
| | | |
|---|---|---|
| B64D 45/00 | (2006.01) | |
| H01Q 1/42 | (2006.01) | |
| B64C 1/36 | (2006.01) | |
| B64D 11/00 | (2006.01) | |
| H01Q 1/28 | (2006.01) | |

(52) U.S. Cl.
CPC ........... B64D 45/00 (2013.01); B64C 1/36 (2013.01); B64D 11/0015 (2013.01); H01Q 1/281 (2013.01); H01Q 1/42 (2013.01)

(58) Field of Classification Search
CPC ............ B64D 45/00; B64C 1/36; H01Q 1/42
USPC ...................................... 244/129.1
See application file for complete search history.

(56) References Cited

U.S. PATENT DOCUMENTS

| | | | |
|---|---|---|---|
| 4,067,950 A | | 1/1978 | Baruschke et al. |
| 5,318,251 A | * | 6/1994 | Bergh ............... H01Q 1/427 150/166 |
| 5,344,685 A | | 9/1994 | Cassell |
| 5,550,555 A | | 8/1996 | Cottrell |
| 5,662,293 A | * | 9/1997 | Hower ............. B29C 70/086 244/121 |
| 5,683,646 A | | 11/1997 | Reiling, Jr. |
| 6,439,048 B1 | * | 8/2002 | Hui ................. G01P 13/025 73/181 |
| 6,439,505 B1 | | 8/2002 | Hyde et al. |
| 6,768,471 B2 | | 7/2004 | Bostwick et al. |
| 6,911,955 B2 | | 6/2005 | Fossey, Jr. et al. |

(Continued)

*Primary Examiner* — Brian M O'Hara
*Assistant Examiner* — Keith L Dixon
(74) *Attorney, Agent, or Firm* — Lando & Anastasi, LLP

(57) ABSTRACT

A containment system for containing all or part of a radome and an external subassembly that is protected by the radome is disclosed. One embodiment of the containment system comprises a fabric material and an attachment system for attaching the fabric material to the radome and to the radome attachment ring. An increased strength radome for covering the external subassembly is also disclosed.

23 Claims, 17 Drawing Sheets

(56) References Cited

U.S. PATENT DOCUMENTS

| | | |
|---|---|---|
| 8,130,167 B2 | 3/2012 | Glabe et al. |
| 8,497,812 B2 | 7/2013 | Harokopus et al. |
| 2012/0326915 A1* | 12/2012 | Hill .................... G01S 13/9303 342/30 |
| 2015/0022423 A1* | 1/2015 | Johnson .................. H01Q 1/42 343/872 |
| 2015/0116184 A1* | 4/2015 | Curran ................ B29C 44/1271 343/872 |

* cited by examiner

CONTAINMENT SYSTEM AND INCREASED STRENGTH RADOME ASSEMBLY

CROSS REFERENCE TO RELATED APPLICATIONS

The present application claims the benefit of U.S. Provisional Patent Application No. 61/924,025, filed Jan. 6, 2014, which claims the benefit of U.S. Provisional Patent Application No. 62/037,529, filed on Aug. 14, 2014, which are both incorporated herein by reference in their entirety.

BACKGROUND

Field of the Invention

The present invention relates to containment system, in particular, a system that can be mounted within a radome to contain an antenna and communications subsystem mounted on a fuselage of an aircraft and covered by the radome. The present invention also relates to an increased strength radome for covering an antenna and communications subsystem.

Discussion of Related Art

Some related art communication systems for in flight television, internet, telephone and other communication services include an external subassembly that is mounted on an exterior surface of the aircraft, and an internal subassembly that is located within the aircraft, the external and internal subassemblies being communicatively coupled to one another. The external subassembly may comprise an antenna array as well as mounting equipment and steering actuators to move the antenna array in azimuth, elevation and polarization (for example, to track a satellite or other signal source). The external sub-system also comprises a radome to reduce drag force generated by the external subassembly, to protect the external subassembly from the environment and provide a favorable environment for the external subassembly to operate in, and a mounting assembly to mount the radome to the aircraft fuselage. There is a concern, for example from the Federal Aviation Administration, that such external sub-systems may create issues for the aircraft and its passengers should the radome become structurally compromised or even become dislodged from the aircraft fuselage, for example, due to a bird strike.

SUMMARY OF THE INVENTION

Aspects and embodiments of the present invention are directed to a containment system to contain an external subassembly of a communications system that is mounted on an exterior surface of the aircraft. In particular, the containment system prohibits parts of the external subassembly from leaving the fuselage of the aircraft should parts of a radome covering the external subassembly break free or should the radome itself break free. The external subassembly may comprise, for example, an antenna array as well as mounting equipment and steering actuators to move the antenna array in azimuth, elevation and polarization (for example, to track a satellite or other signal source). The external assembly also comprises a radome to reduce drag force generated by the external subassembly, to cover and protect the external subassembly from the environment and provide a favorable environment for the external subassembly to operate, and a mounting assembly to mount the radome to the aircraft fuselage. Aspects and embodiments of the present invention are directed to a containment system to contain the external subassembly to the aircraft fuselage should the radome be structurally compromised or worst-case become dislodged from the fuselage, for example due to a bird strike.

Additional aspects and embodiments are directed to an increased strength radome for covering an external subsystem that may be mounted on an exterior surface of the aircraft. In particular, aspects and embodiments are directed to an increased strength radome incorporating at least one layer of protective polyurethane film or tape, or a micro-layered polyester film or tape, or other tapes or films, used for example in the art of strengthening glass, thereby increasing the strength and shatter resistance of the radome.

According one embodiment, a containment system comprises a fabric material, and an attachment system for attaching the fabric material to a radome.

According to at least one embodiment, the attachment system comprises a radome attachment member. According to one embodiment, the attachment member can be an attaching ring or an attachment plate.

According to at least one embodiment, the attachment system further comprises a plurality of battens that attach to the radome attachment member. According at least one embodiment, the attachment member is an attachment ring and the plurality of battens are configured to attach to the radome attachment ring on the inside of the radome attachment ring.

According to at least one embodiment, the attachment system comprises one alignment fastener for each batten that keeps the battens in alignment during installation.

According to at least one embodiment, the fabric material is fabric netting. According at least one embodiment, the fiber netting is wrapped around the plurality of battens.

According to at least one embodiment, the top part of the battens that the fabric is wrapped around is offset from the attachment ring by a predetermined height. According to aspects of at least one embodiment, the height is less than or equal to 2 inches.

According to aspects of at least one embodiment, the attachment system further comprises a plurality of attachment fasteners. The attachment fasteners can be any of screws, rivets, bolts, shoulder bolts, or any fasteners used in the art, along with mating hardware such as washers, locknuts, nuts, etc. According to one embodiment, the fasteners comprise a plurality of screws thread through respective apertures in the radome and through a respective aperture in the radome attachment ring to secure the battens to the inside of the radome attachment ring. According to aspects of at least one embodiment, the washer and locknut mate with the screw.

According to at least one embodiment, the attachment system further comprises nut plates and spacers that further secure the battens to the radome through respective apertures in the radome.

According to at least one embodiment, the attachment system further comprises a limited peel-off force adhesive resin for adhesion of the fabric netting material to the inside of the radome. According to aspects of at least one embodiment, the limited peel-off force adhesive resin further provides for removal of the fabric from the inside of the radome surface above predetermined forces.

According to at least one embodiment, the fabric comprises holes that are small enough to contain debris from the external sub-system. According to aspects of at least one embodiment, the holes are large enough so that the fabric is flexible enough to be able to conform to the inside surface of the radome.

According to at least one embodiment, the fabric comprises a thermoplastic material that is woven into the fabric. According to at least one embodiment, the fabric comprises a low RF-loss, high aspect ratio polymer material. According to at least one embodiment, the fabric comprises thermoplastic material that can be oriented polyethylene (LDPE, HDPE, and UHMWPE), oriented polypropylene and oriented aramid and any thermoplastic polymer exhibiting similar properties, including, Spectra, Innegra and Kevlar.

According to at least one embodiment, the fabric has a thickness that is less than 0.1".

According to at least one embodiment, the fabric has a strength of at least 500 lbs per linear inch.

According to at least one embodiment, the radome has at least one layer of a protective polymer film or a micro-layered polymer film, thereby providing an increased strength and shatter resistance radome. According to aspects of at least one embodiment, the at least one layer of a protective polymer film or a micro-layered polymer film is applied to an outer surface of the radome. According to aspects of another embodiment, the at least one layer of a protective polymer film or a micro-layered polymer film is at least one layer of the radome. According to aspects of another embodiment, the at least one layer of a protective polymer film or a micro-layered polymer film is applied to an inner surface of the radome. According to at least one embodiment, the at least one layer of a protective polyurethane film or a micro-layered polyester film comprises a polyurethane film or a micro-layered polyester. According to aspects of at least one embodiment, the polymer comprises 3M's Ultra 600.

According to at least one embodiment, the containment system attaches to the radome and to the radome attachment ring.

According to at least one embodiment, the containment system includes a netting material that is attached to the radome.

According to at least one embodiment, the netting material attaches to the radome attachment ring by a battens assembly.

According to at least one embodiment, the netting material includes holes small enough to contain any objects of significant size, e.g. greater a few pounds, and that are large enough to provide the netting with sufficient flexibility to conform to an inside surface of the radome. According to at least one embodiment, the netting fabric is sized to fail at loads greater than 1000 pounds per inch.

According to at least one embodiment, the containment system includes a netting material that is a thermoplastic material. According to aspects of at least one embodiment, the thermoplastic material can comprise any of or any combination of Spectra, Innegra, and Kevlar. According to at least one embodiment, the netting material attaches to the radome attachment ring by a battens assembly including a plurality of battens that attach to the inside of the radome attachment ring. According to aspects of at least one embodiment, the netting material attaches to the plurality of battens with at least 30 mechanical fasteners.

According to at least one embodiment, the netting material is sewn around a battens assembly. According to aspects of at least one embodiment, the netting material is double stitched with a high tensile fiber.

According to at least one embodiment, the containment system includes a netting material that is attached to the inside of the radome to keep the netting material off of the external subassembly. According to aspects of at least one embodiment, the containment netting material is attached at the front and the back of the radome with at least eight attachment points.

According to aspects of at least one embodiment, the netting material is attached to the inside of the radome with a limited peel off force elastomer, high strain polymer or resin that keeps the netting attached to the inside of the radome under normal forces but peels off of the inside of the radome upon severe impact to the radome. According to at least one embodiment, the containment system is able to take a 6000 pound impact load and handle a 2000 pound drag load.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

Figure 3:
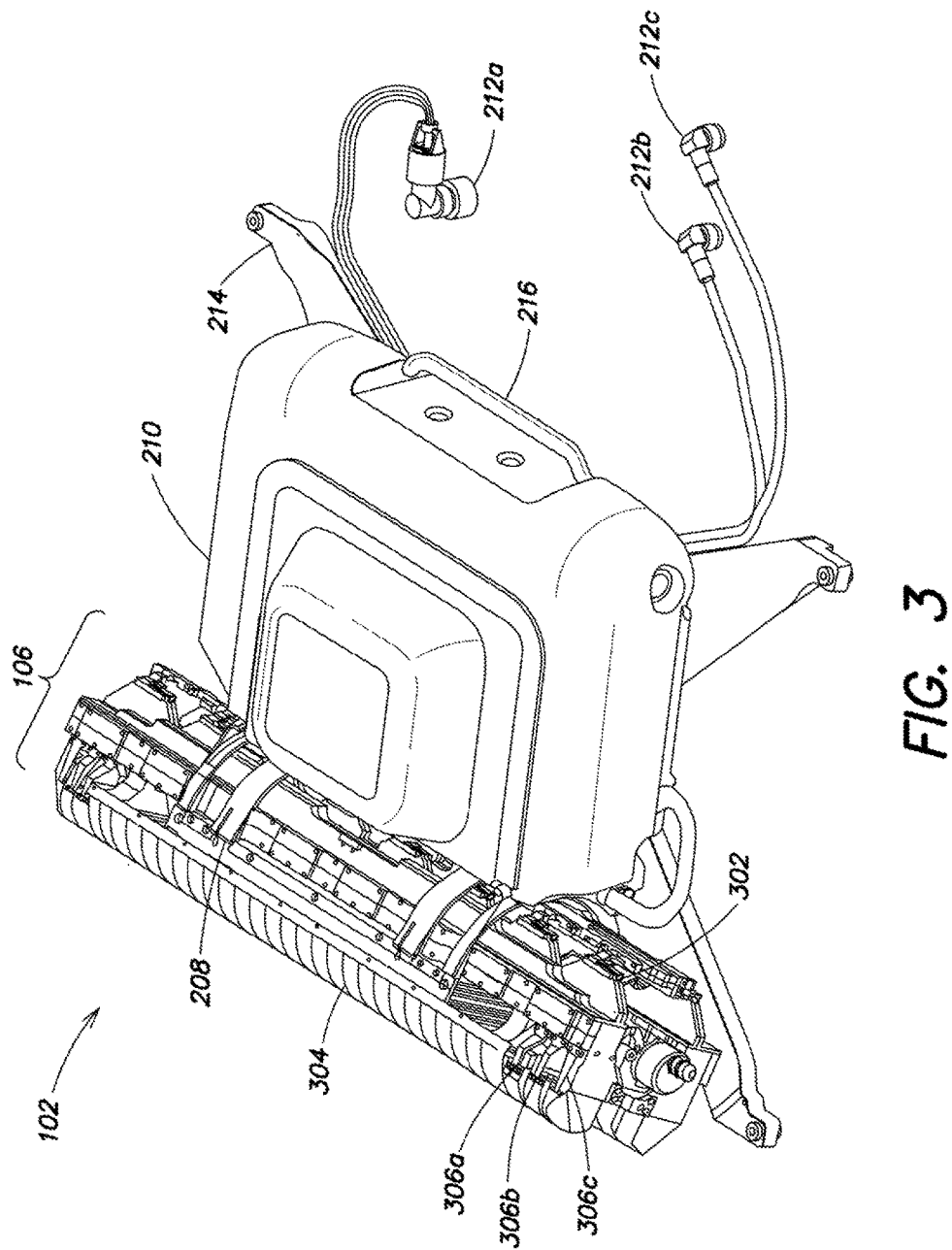
Figure 4A:
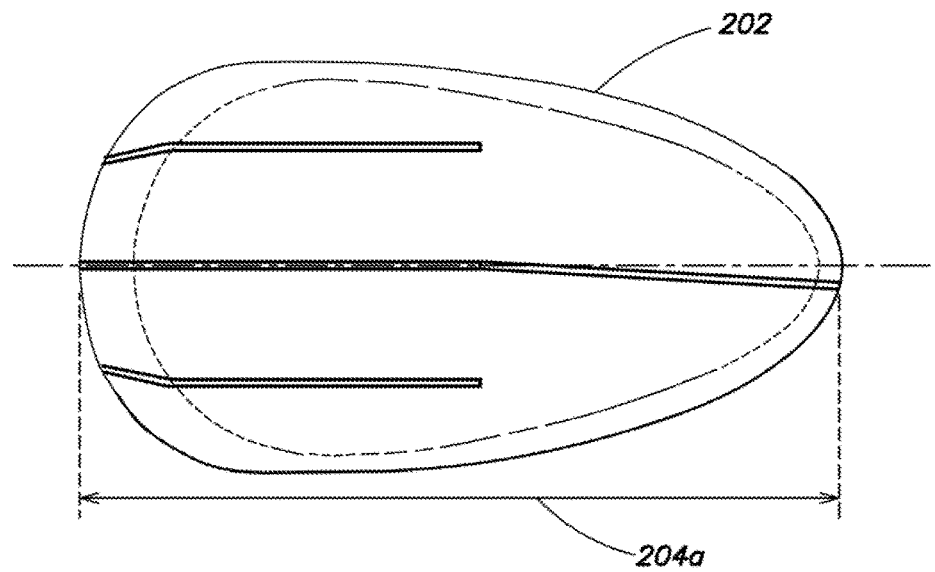
Figure 4B:
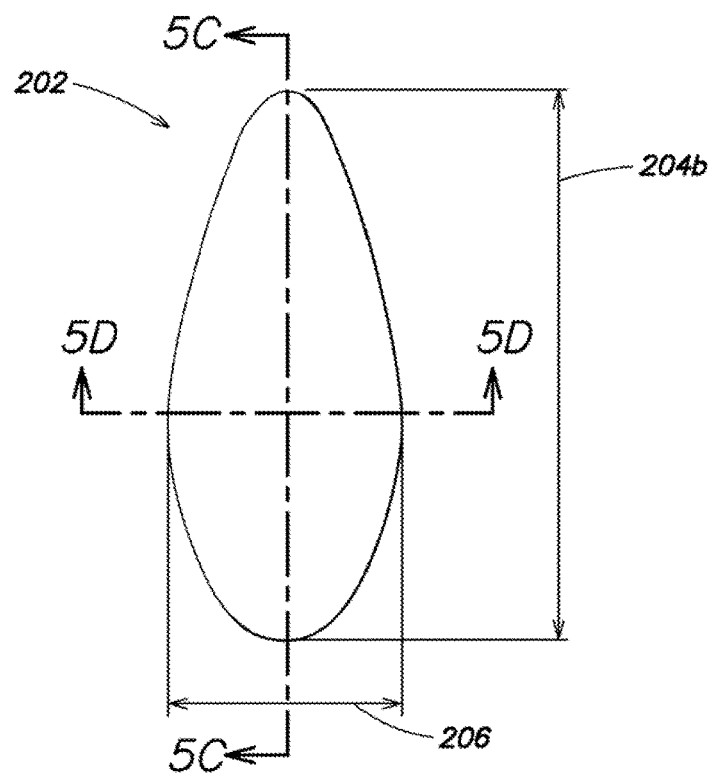
Figure 4C:
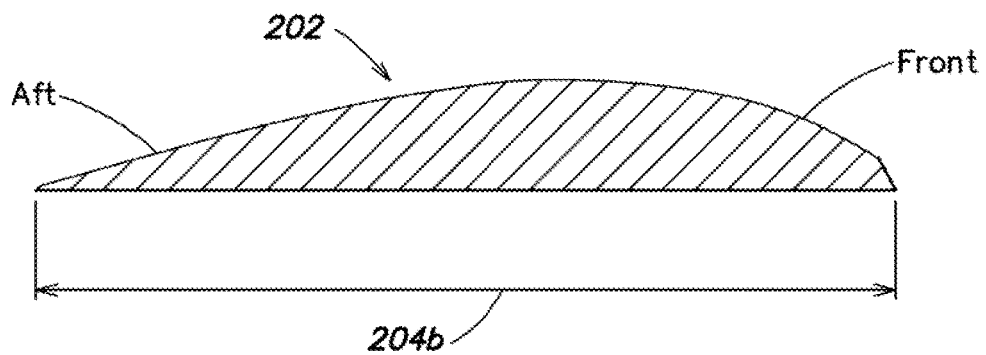
Figure 4D:
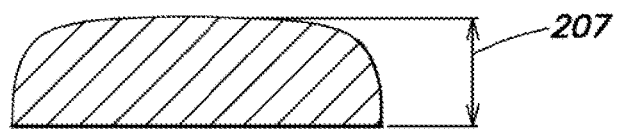
Figure 5:
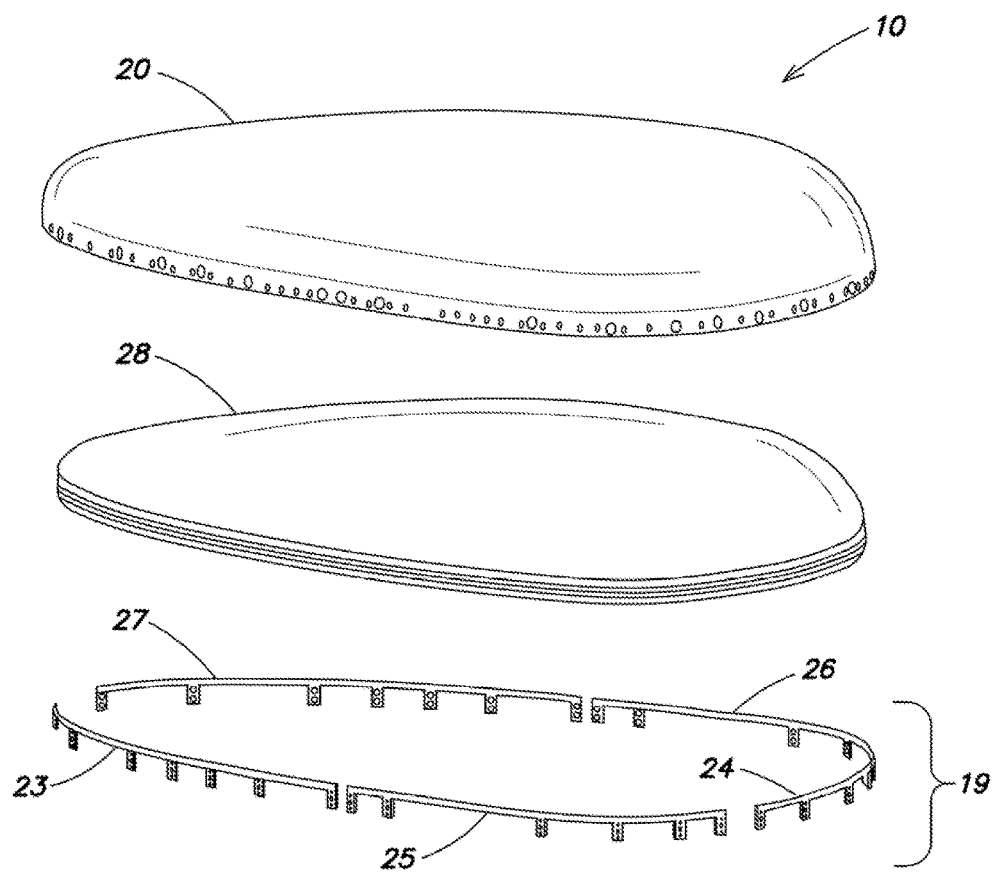
Figure 6:
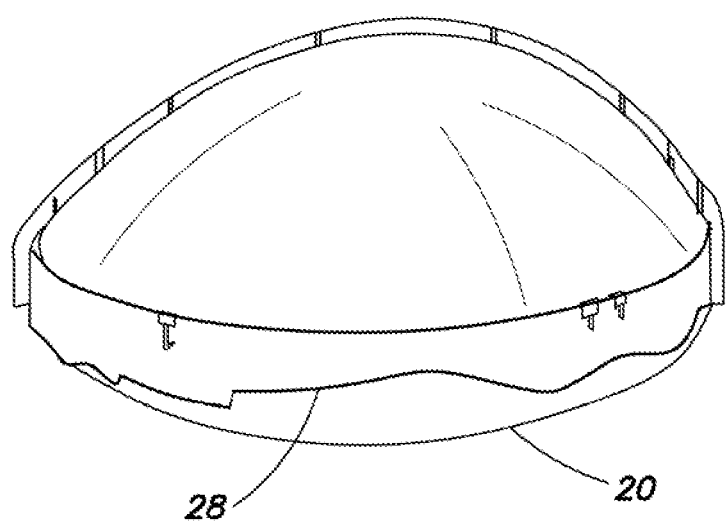
Figure 7:
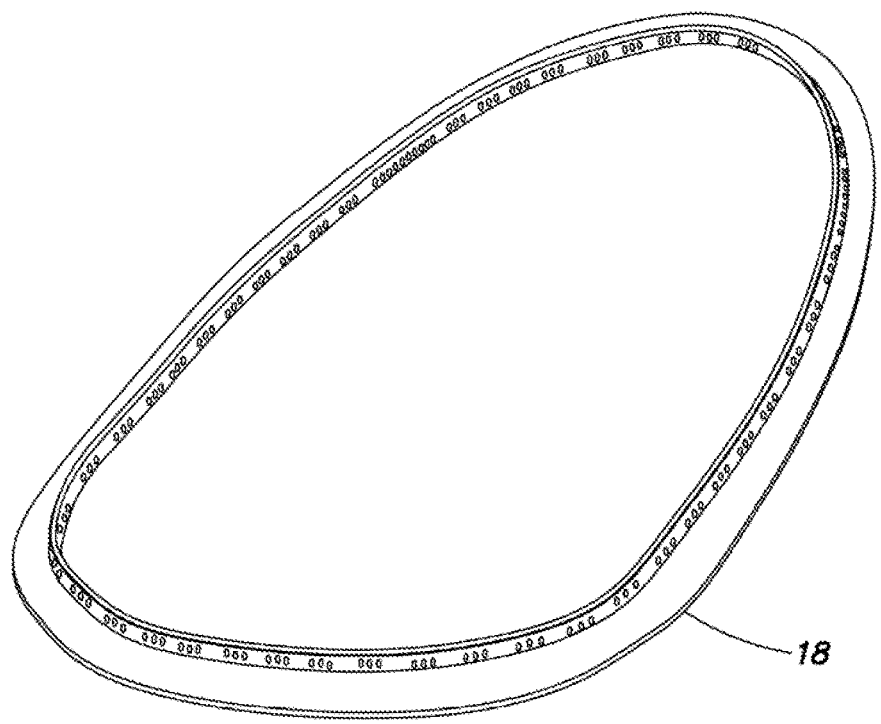
Figure 8:
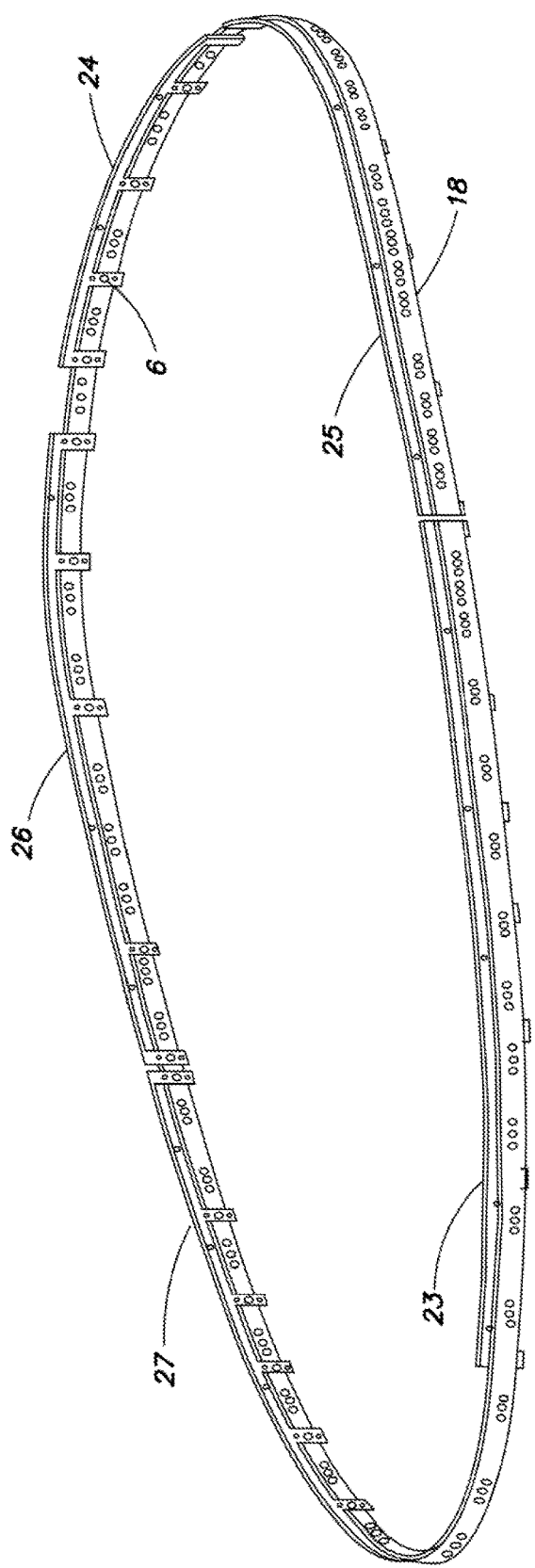
Figure 9:
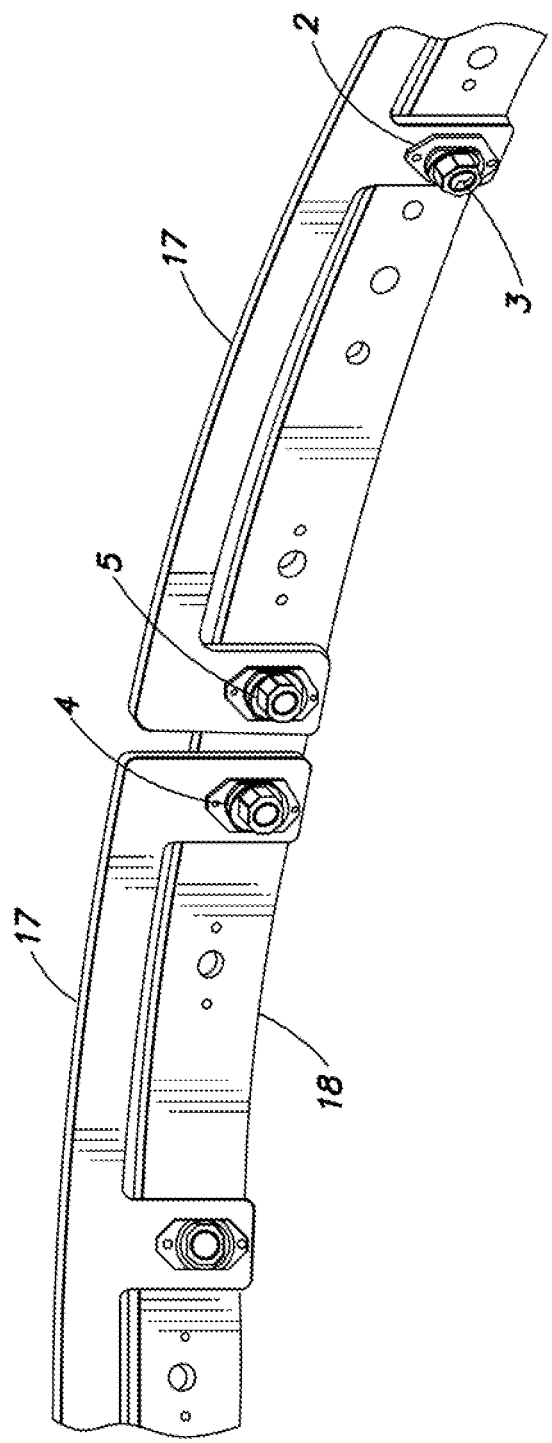
Figure 10A:
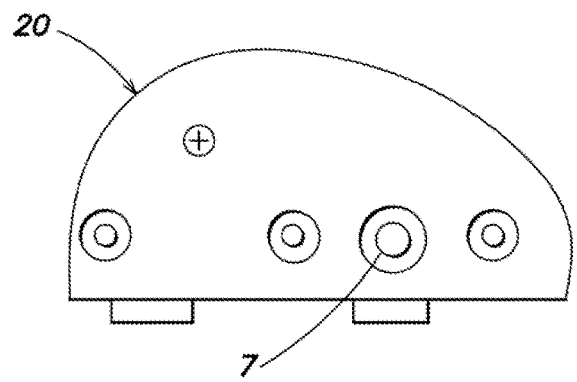
Figure 10B:
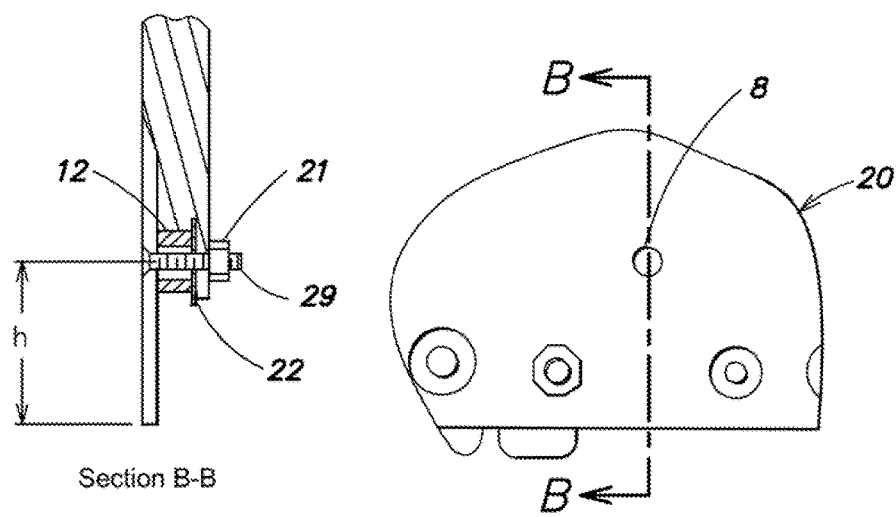
Figure 11:
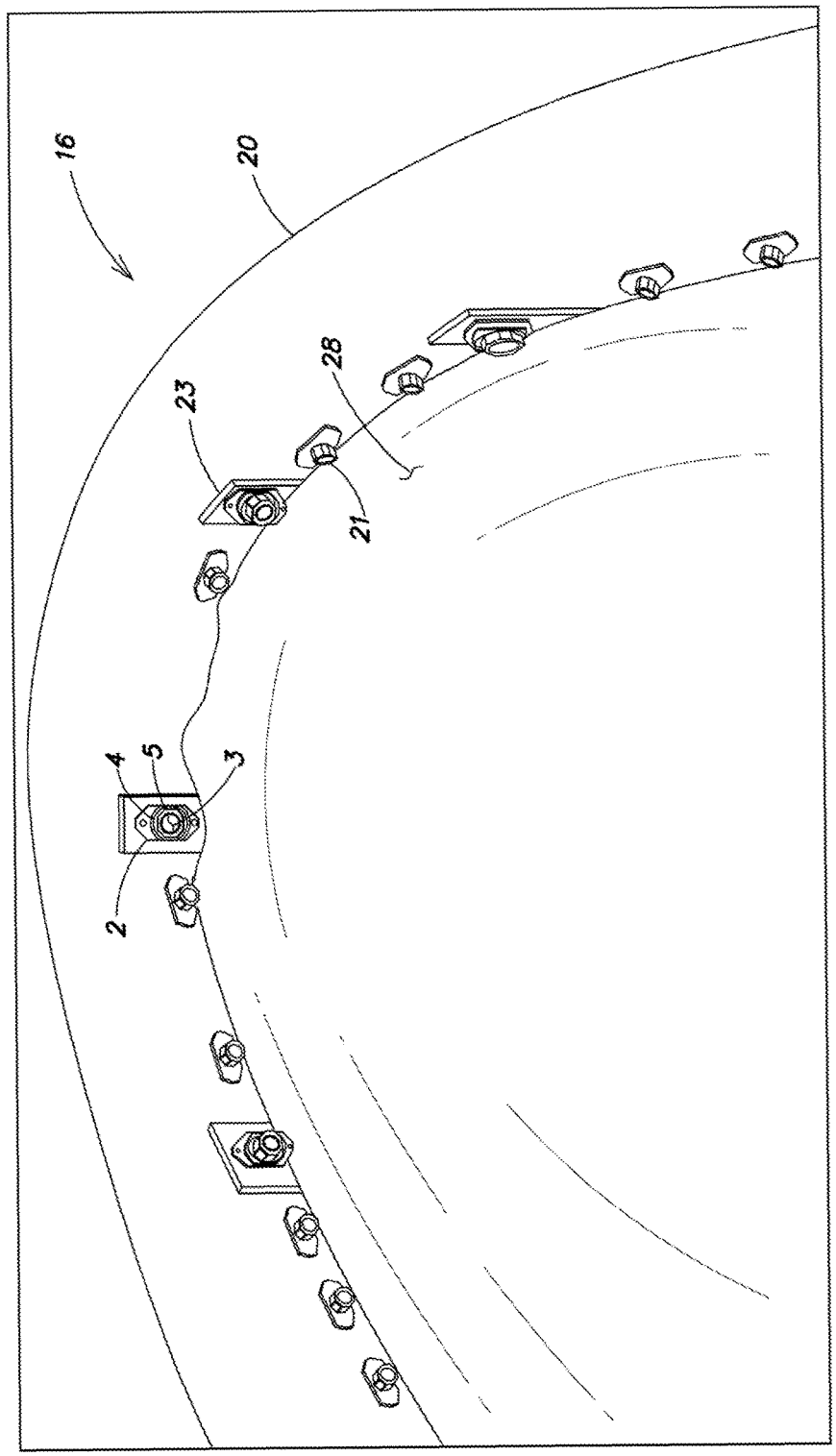
Figure 12:
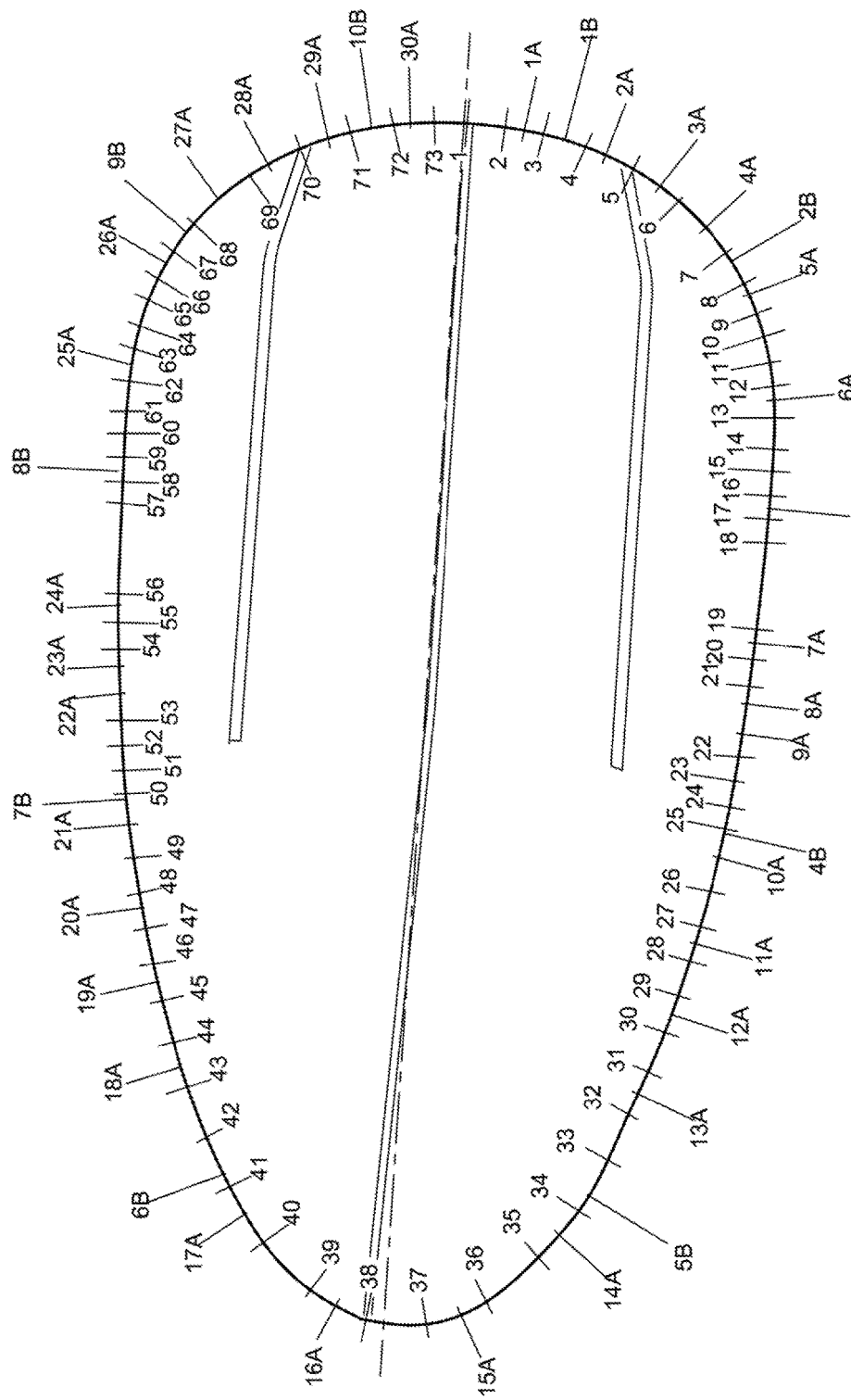
Figure 13:
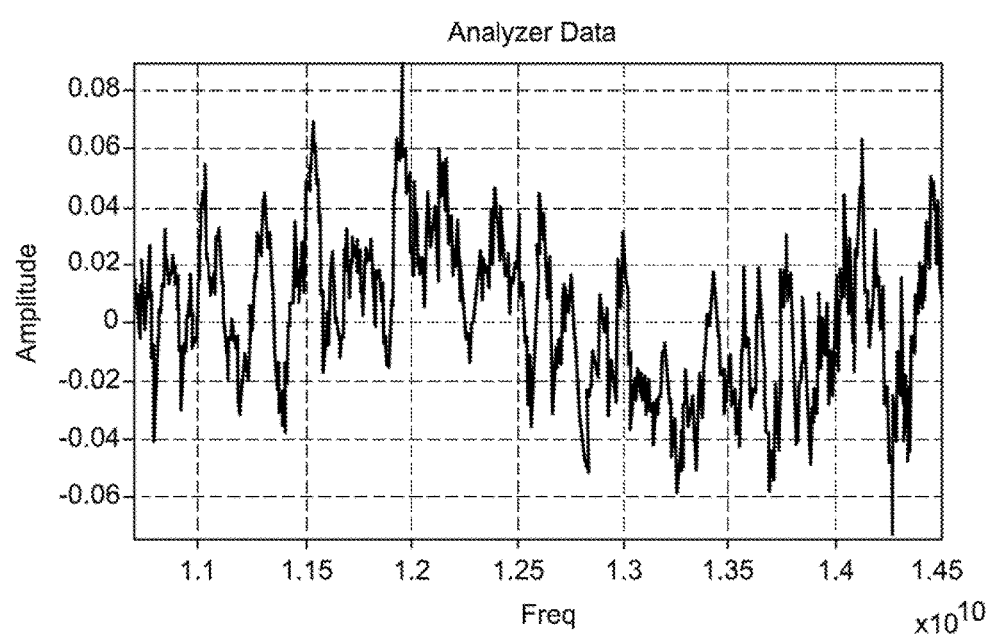
Figure 14:
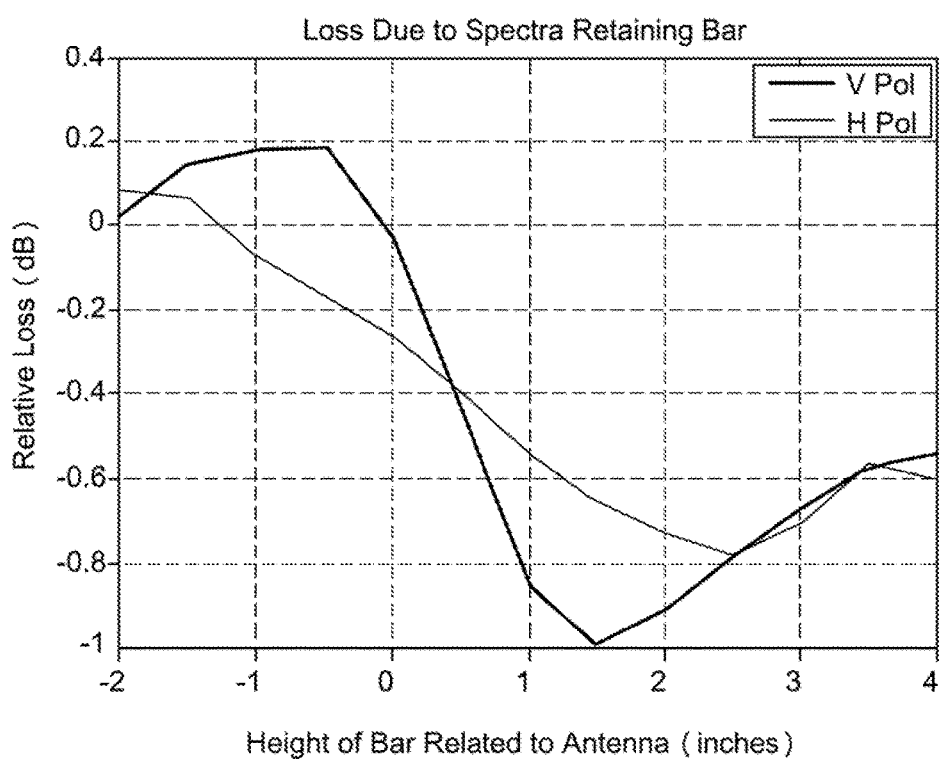
Figure 15:
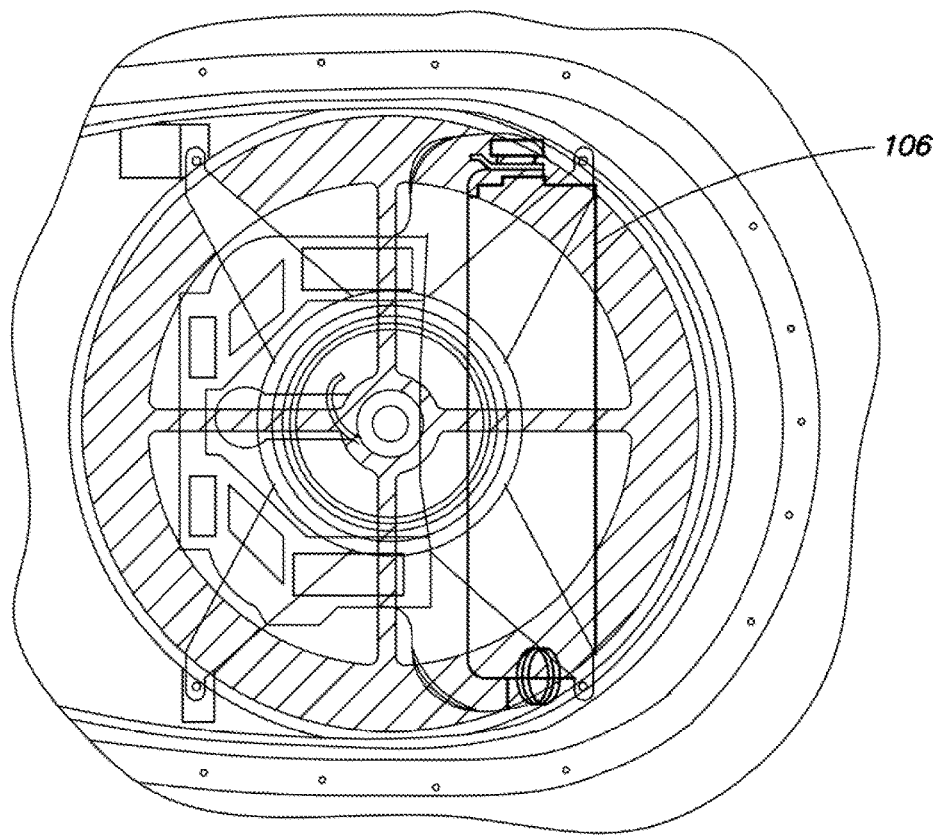

Table I illustrates some of the variables that exist for reception of direct broadcast signals that are accommodated by the antenna assembly and system of the present invention;

FIG. 3 is a perspective view of one example of an external sub-system according to the related art;

FIG. 4A is a plan view of one example of a radome according to aspects of the invention;

FIG. 4B is a plan view of another example of a radome according to aspects of the invention;

FIG. 4C is a cross-sectional view of the radome of FIG. 4B taken along line 4C-4C in FIG. 4B;

FIG. 4D is a cross-sectional view of the radome of FIG. 1B taken along line 4D-4D in FIG. 4B;

Exhibit I is a product specification of one example of a layer of a micro-layered polyester film or tape that can be used as a layer of the radome of FIGS. 4A-4D;

FIG. 5 illustrates a containment system including a containment netting material that is configured to be attached to a radome, according to aspects of the disclosure;

Table II is a table of properties of some of the materials considered for the containment netting;

FIG. 6 illustrates a Spectra fiber containment netting laid out on the inside of the radome;

FIG. 7 illustrates a radome attachment ring to attach the radome to the fuselage of the plane;

FIG. 8 illustrates a battens assembly for attaching the containment netting to the radome attachment ring;

FIG. 9 illustrates an exploded view of a batten attached to the inside of the radome attachment ring;

FIG. 10A illustrates an exterior view from the outside of the radome of the batten attachment to the radome ring through the radome;

FIG. 10B illustrates nut plates, a flat head screw, a spacer, and nut to secure the netting sewn around the battens to the radome through an aperture in the radome;

FIG. 11 is a picture of the attachment system, the radome and the netting;

FIG. 12 illustrates a perspective view of the radome 20 having a plurality of apertures for attaching the radome 20 to the radome attachment ring, additional apertures for attaching the battens to the radome attachment ring, and further apertures for the batten alignment fasteners;

FIG. 13 is a comparative RF analysis of insertion loss of Spectra on the signal bandwidths of interest at a normal incidence angle;

FIG. 14 is a graph of measured the RF Insertion loss of the containment system including the batten assembly versus the relative height of the battens;

FIG. 15 illustrates the antenna sweep volume within the radome assembly; and

Figure 16:
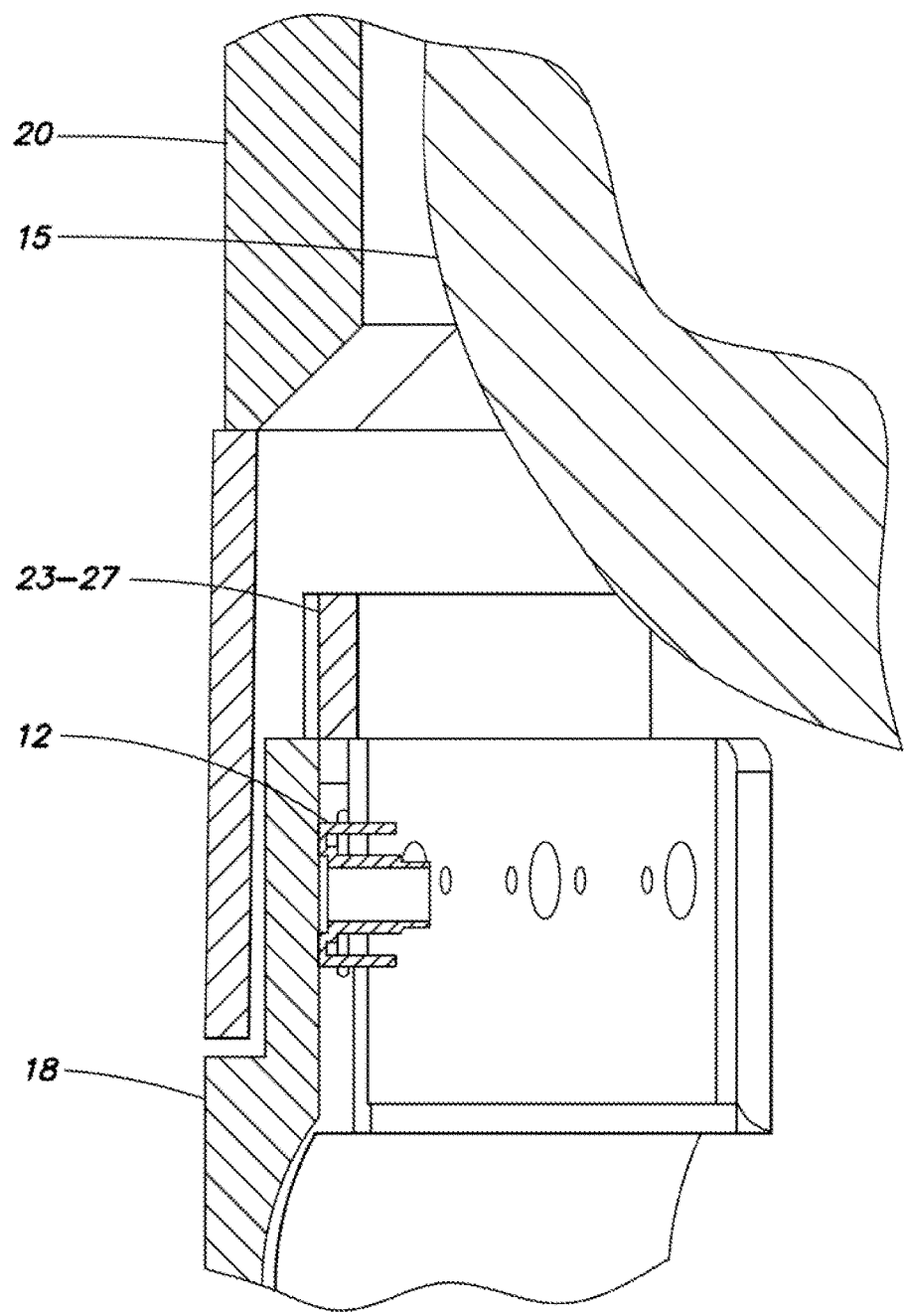

FIG. 16 illustrates an exploded view of the batten assembly and the air gap clearance within the antenna sweep volume.

DETAILED DESCRIPTION

Aspects and embodiments of the present invention are directed to a containment system to contain a communications system mounted, in part, on an aircraft fuselage to provide in flight communication and entertainment services such as, for example, in flight television, internet, telephone and other communication services. The communication system may generally include an external subassembly that is mounted on an exterior surface of the aircraft, and an internal subassembly that is located within the aircraft, the external and internal subassemblies being communicatively coupled to one another. The external subassembly comprises, for example, an antenna array as well as mounting equipment and steering actuators to move the antenna array in azimuth, elevation and polarization (for example, to track a satellite or other signal source). The system also comprises a radome to reduce drag force generated by the external subassembly, to cover and protect the external subassembly from the environment and provide a favorable environment for the external subassembly to operate, and a mounting assembly to mount the radome to the aircraft fuselage. Aspects and embodiments of the disclosure are directed to a containment system to contain the external subassembly should the radome be structurally compromised or worst-case become dislodged from the fuselage, for example due to a bird strike.

It is to be appreciated that the invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items. In addition, for the purposes of this specification, the term "antenna" refers to a single antenna element, for example, a single horn antenna, patch antenna, dipole antenna, dish antenna, or other type of antenna, and the term "antenna array" refers to one or more antennas coupled together and including a feed network designed to provide electromagnetic signals to the antennas and to receive electromagnetic signals from the antennas.

Figure 1:
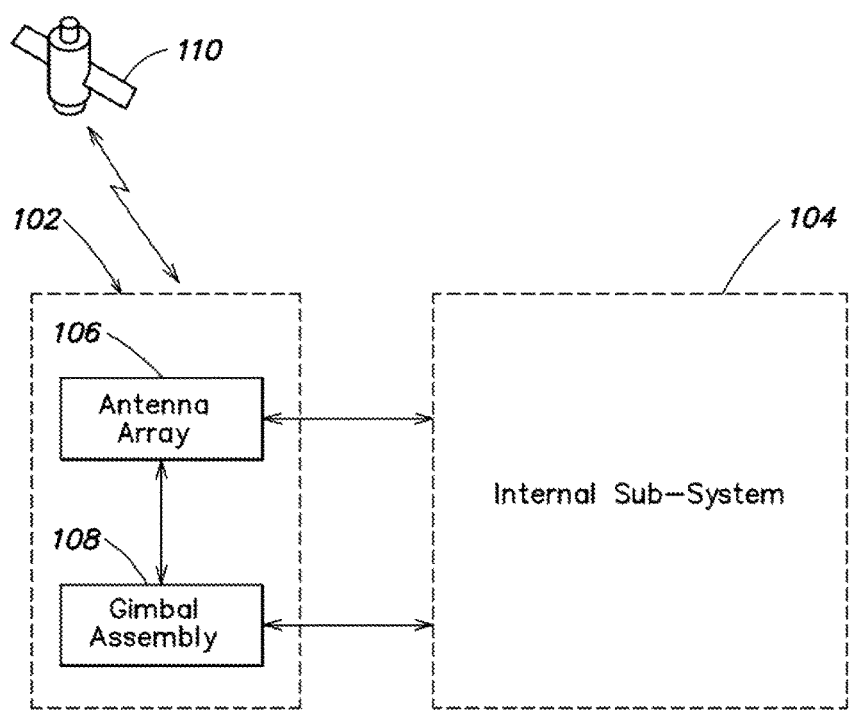
FIG. 1 is a functional block diagram of one example of a communications system according to the related art.

Referring to FIG. 1, there is illustrated a block diagram of one example of a communications system including an external sub-system 102 and an internal sub-system 104. The external sub-system 102 comprises an antenna array 106 and a gimbal assembly 108. The antenna array 106 receives communications signals from a signal source 110 and can also transmit signals to one or more destinations.

Figure 2:
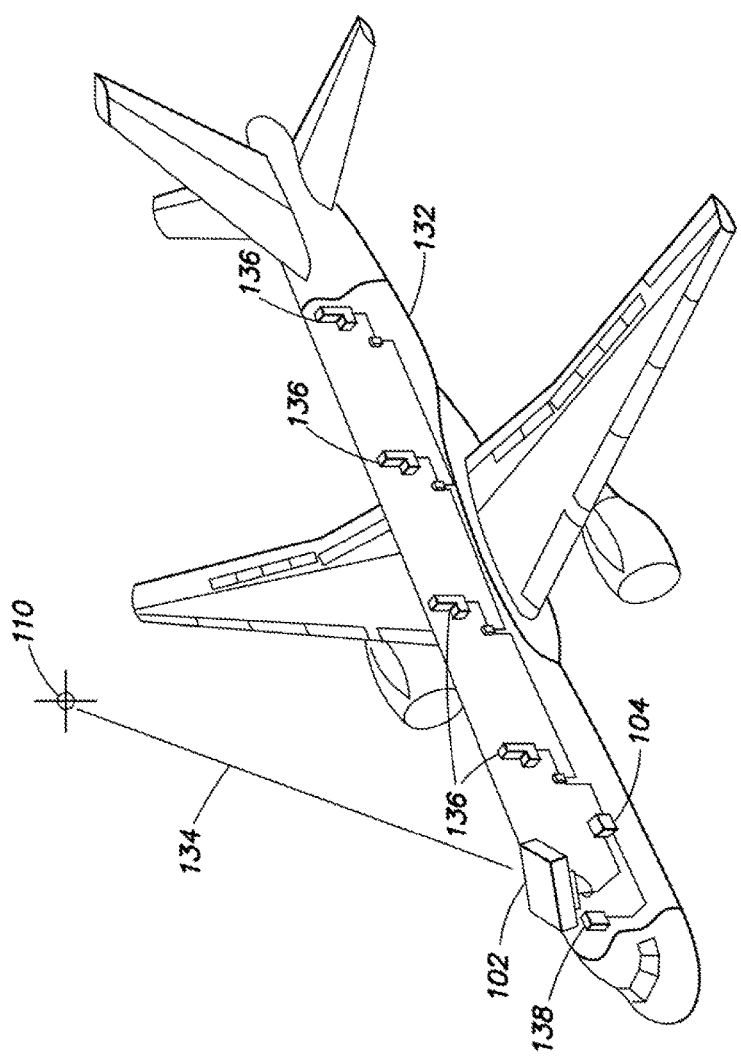
FIG. 2 is an illustration of an aircraft showing a portion of a communications system mounted in and on the aircraft in accordance with the related art.

According to aspects of this embodiment, the communication system is mounted on and in a vehicle, such as an aircraft. Referring to FIG. 2, there is illustrated an example of an aircraft 132 equipped with a communications system (illustrated as a simple block), according to aspects of the invention. The external sub-system 102 may be mounted to the aircraft 132 at any suitable location. The location of mounting of the external sub-system 102 on the aircraft 132 (or other vehicle) may be selected by considering various factors, such as, for example, aerodynamic considerations, weight balance, ease of installation and/or maintenance of the system, Federal Aviation Administration (FAA) requirements, interference with other components, and field of view of the antenna array. As discussed above, the external sub-system 102 includes an antenna array 106 (See FIG. 1) that receives an information signal of interest 134 from a signal source 110. The signal source 110 may be another air craft, a satellite, a fixed or stationary platform, such as a base station, tower or broadcasting station, or any other type of information signal source. The information signal 134 may be any communication signal, including but not limited to, TV signals, signals encoded (digitally or otherwise) with maintenance, positional or other information, voice or audio transmissions, data transmissions, etc.

As known to those familiar with the operation of satellites in many regions of the world, there exists a variety of satellites operating frequencies resulting in broad bands of frequency operations. Direct Broadcast satellites, for example, may receive signals at frequencies of approximately 13.75 GHz to 14.5 GHz or 27 GHz to 31 GHz while the satellite may send down signals in a range of frequencies from approximately 10.7 GHz to 12.75 GHz or 17.3 GHz to 21.2 GHz. Table I below illustrates some of the variables, in addition to frequency, that exist for reception of direct broadcast signals, which are accommodated by the antenna assembly and system of the present invention. The signal source 110 may include any of these, or other, types of satellites.

TABLE I

| Service Region | Service Provider | Satellites | Satellite Longitude | Polarization | Primary Conditional Access | Digital Broadcast Format |
|---|---|---|---|---|---|---|
| Canada | ExpressVu | Nimiq | 268.8°E | Circular | Nagravision | DVB |
| CONUS | DIRECTV | DBS 1/2/3 | 259.9°E | Circular | Videoguard | DSS |

TABLE I-continued

| Service Region | Service Provider | Satellites | Satellite Longitude | Polarization | Primary Conditional Access | Digital Broadcast Format |
|---|---|---|---|---|---|---|
| Europe | TPS Tele + Digitale Stream | Hot Bird 1-4 | 13.0°E | Linear | Viaccess | DVB |
| Europe | Sky Digital | Astra 2A | 28.2°E | Linear | Mediaguard | DVB |
| Europe | Canal Plus | Astra 1E-1G | 19.2°E | Linear | Viaccess & Mediaguard | DVB |
| Japan | Sky PerfecTV | JCSAT-4A | 124.0°E 128.0°E | Linear | Multi-access | DVB |
| Latin America | DIRECTV GLA | Galaxy 8-i | 265.0°E | Circular | Videoguard | DSS |
| Malaysia | Astro | Measat 1/2 | 91.5°E | Linear | Cryptoworks | DVB |
| Middle East | ADD | Nilesat 101/102 | 353.0°E | Linear | Irdeto | DVB |

Still referring to FIG. 2, the communication system may include or may be coupled to a plurality of passenger interfaces, such as seatback display units 136, associated headphones and a selection panel to provide individual channel selection, Internet access, and the like to each passenger. Alternatively, for example live video may also be distributed to all passengers for shared viewing through a plurality of screens placed periodically in the passenger area of the aircraft. Signals may be provided between the internal sub-system 104 and the passenger interfaces either wirelessly or using cables. Further, the communications system may also include a system control/display station 138 that may be located, for example, in the cabin area for use by, for example, a flight attendant on a commercial airline to control the overall system and such that no direct human interaction with the external subassembly is needed except for servicing and repair. In one example, the communication system may be used as a front end of a terrestrial or satellite video reception system on a moving vehicle such as the aircraft of FIG. 2. The satellite video reception system can be used to provide to any number of passengers within the vehicle with live programming such as, for example, news, weather, sports, network programming, movies and the like.

Referring to FIG. 3, there is illustrated in perspective view one embodiment of an external sub-system 102. As discussed above, the external sub-system 102 comprises the antenna array 106 that is adapted to receive signals from the signal source (110 in FIG. 1) and to transmit signals. The antenna array 106 includes a plurality of antenna elements (not shown) coupled to a feed network 302. In one example, these antenna elements are horn antennas and the feed network 302 is a waveguide feed network. In one embodiment, each of the antenna elements may be coupled to a respective lens 304 configured to improve the gain of the respective antenna element. Retaining clips 306a, 306b and 306c may be used to fasten the lenses 304 to the respective antenna elements. According to one embodiment, the antenna array 106, by virtue of the construction and arrangement of the feed network 302 and antenna elements, forms a substantially rigid structure. From a structural oscillation point of view, the antenna array 106 may therefore act as a single unit, rather than an array of multiple individual units. An advantage of such a substantially rigid structure for the antenna array 106 may include minimal oscillation of the antenna array which could otherwise adversely affect the performance and pointing accuracy of the antenna array.

The antenna array 106 may be mounted to the gimbal assembly 108 using an antenna mounting bracket 208. Still referring to FIG. 3, in at least some embodiments, a substantial portion of the external sub-system 102 may be covered by a cover 210. The cover 210 may provide environmental protection for at least some of the components of the external sub-system 102. Cables 212a, 212b and 212c may be used to carry data, power and control signals between the internal sub-system 104 and the external sub-system 102. The external sub-system 102 may be mounted to the vehicle using a mounting bracket 214 that can be fastened to the body of the vehicle (e.g., to the fuselage of aircraft 132).

According to aspects of one embodiment, an external sub-system 102 of a communications system mounted on an aircraft fuselage may be covered by a radome 202 that may serve to reduce drag force generated by the external sub-system 102 as the aircraft moves. An example of a radome 202 that can be used in such situations is illustrated in FIG. 4A. In one embodiment, the radome 202 has a maximum height of about 9.5 inches and a length 204a of about 64.4 inches. However, it is to be appreciated that the size of the radome 202 in any given embodiment may depend on the size of the antenna array 106 and other components of the external sub-system 102. Another example of a radome 202 is illustrated in outline form in FIGS. 4B (top view), 4C (cross-section taken along line 4C-4C in FIG. 4B), and 4D (cross-section taken along line 4D-4D in FIG. 4B). In one example, the radome 202 has a length 204b of about 93 inches, a width 206 of about 40 inches, and a maximum height 207 of about 11.8 inches. In the example illustrated in FIGS. 4B-4D, the radome 202 has a greater length-to-height ratio than the example illustrated in FIG. 4A to reduce the slope to the trailing edge of the radome, and thereby to reduce high speed air flow on the aft portion of the radome. It is to be appreciated that the radome 202 is transmissive to radio frequency (RF) signals transmitted and/or received by the antenna array and communications subsystem mounted on the vehicle. The radome 202 may be made of materials known to those of skill in the art including, but not limited to, laminated plies of fibers such as quartz or glass, and resins such as epoxy, polyester, cyanate ester or bismaleamide. These or other materials may be used in combination with honeycomb or foam to form a highly transmissive, light-weight radome construction.

It is typical in such applications for the radome 202 and the communications external sub-system 102 covered by the radome to encounter all ranges of environmental conditions. For example, the radome can be impacted by dust, birds, and other debris in the air as the plane is moving. In addition, the radome 202 can encounter all ranges of environmental conditions from extreme heat, cold, and all sorts of precipitation such as snow, rain, sleet, hail, lighting, etc. Accordingly, the radome 202 and the communication external sub-system 102 have to be able to withstand all such conditions and impacts without compromising the radome or the communication subsystem that it is protecting. Accordingly, aspects and embodiments are directed to an increased strength radome 202 incorporating at least one layer of protective polyurethane film or tape, or a micro-layered polyester film or tape, or other tapes or films used for example in the art of strengthening glass, thereby increasing the strength and shatter resistance of the radome 202 for protecting the communication system from impacts, such as for example due to bird strikes, and all sorts of environmental conditions.

Aspects and embodiments are directed to an increased strength radome 202 incorporating at least one layer of protective polyurethane film or tape, or a micro-layered polyester film or tape, such as for example 3M's Ultra 600 product identified in Exhibit I. In particular, any of the embodiments of the polyurethane film or tape, or a micro-layered polyester film or tape, or other tapes or films used for example in the art of strengthening glass, can be incorporated as one of the layers that make up the radome. Referring to FIG. 4B-4D as a reference, according to one embodiment, the polyurethane protective tape can applied to the outer surface of the radome 202. With this arrangement, the protective polyurethane film or tape, or a micro-layered polyester film or tape, or other tapes or films used for example in the art of strengthening glass, can be applied either before or after the radome is installed. According to another embodiment, polyurethane protective tape can replace an existing layer of the radome structure or be an added layer integrated into the radome as it is manufactured. According to another embodiment, the protective polyurethane film or tape, or a micro-layered polyester film or tape, or other tapes or films used for example in the art of strengthening glass, also is incorporated on the inner surface of the radome, either as an added layer to the radome or as a replacement to an inner layer.

It is to be appreciated that the protective polyurethane film or tape, or a micro-layered polyester film or tape, or other tapes or films used for example in the art of strengthening glass, can be provided as one or more layers to the radome structure regardless of where it is provided. For example, the protective polyurethane film or tape, or a micro-layered polyester film or tape, or other tapes or films used for example in the art of strengthening glass, can be provided or added as one, two or three layers to the radome structure. For example, the protective polyurethane film or tape, or a micro-layered polyester film or tape, or other tapes or films used for example in the art of strengthening glass, can be added or replace any or all of an outer layer, middle layer or inner layer. In addition, the protective polyurethane film or tape, or a micro-layered polyester film or tape, or other tapes or films used for example in the art of strengthening glass, can be provided as any combination of layers such as only an outer layer, only an inner layer, only a middle layer, and can also be provided or replace any such combination of layers such as both an outer layer and a middle layer, both an outer layer and an inner layer, both a middle layer and inner layer or all of an outer layer, a middle layer and an inner layer.

It is also appreciated that protective polyurethane film or tape, or a micro-layered polyester film or tape, or other tapes or films used for example in the art of strengthening glass, does not need to be limited to a complete layer. For example, the protective polyurethane film or tape, or a micro-layered polyester film or tape, or other tapes or films used for example in the art of strengthening glass, can be provided at various places or areas on or within the radome. It is also appreciated that protective polyurethane film or tape, or a micro-layered polyester film or tape, or other tapes or films used for example in the art of strengthening glass, can be provided any place or area or within the radome, as it should have very little to no substantial impact on the electrical performance of the radome. For example, 3M has RF tested the material in Exhibit I and has shown that it has an RF loss of less than about 3 percent. In other words, the transmission properties of the RF through the protective polyurethane film or tape, or micro-layered polyester film or tape is approximately 97%.

It is appreciated that by incorporating the polyurethane protective tape or film in or on the radome, similar to the way it is used in safety glass, the radome will be less susceptible to damage when it is struck by an object, such as a bird, rock or hail. According to one embodiment, it is considered that the ultra 600 polyurethane protective tape identified in Exhibit I can be used as discussed herein. However, it is also appreciated that any of the identified polyurethane protective tapes identified in Exhibit I can be used. It is also appreciated that other products or films by other manufacturers can be used.

As noted above, there is a concern that such communication systems described may create issues for the aircraft and its passengers should the radome 202 become structurally compromised or even become dislodged from the aircraft fuselage, for example, due to a bird strike. Thus, there is also need for a containment system that will structurally contain the external subassembly of the communication system should the radome 202 be compromised or dislodged from the fuselage. In addition, other design constraints that exist for the containment system so that it can operate with such communication systems include that the RF loss of the containment system and the radome should be less than or equal to 2.0 dB over the operating frequency band, and the RF loss of the containment system itself should be less than or equal to 0.5 dB. In addition, the radome thickness should not increase by more than 0.02" in due to the containment system. Further, the total mass of the containment system should be minimal, for example, to add no more than a few pounds. Still further design constraints on the containment system are that the system should be simple, it should be such that the need for field re-work is kept to a minimum, the cost should be minimized, the containment system should not require repainting the radome, the containment system should ideally have a high die-electric constant so that prior lightning tests on the communications system are still valid, and the change of load path on the external sub-system is minimal due to the added containment system, so there is no need to further reinforce the air craft substructure. In particular, the containment system should be able to sustain force of 2000 lbs drag load force based on drag equation where $\rho$ is air density, v is air velocity, $C_D$ is drag coefficient, and A is cross sectional area of antenna gimbal pitched at 90 degrees vertical.

With the above design constraints in mind, the applicants have invented a structural reinforcement/containment bag that prohibits debris from leaving the aircraft if parts of the radome or the radome itself were to break free. In particular, the applicants have developed a containment bag comprising a fabric and an attachment system that directly attaches the fabric bag to a radome and to the radome attachment ring that the radome attaches to, so that even if parts of the radome were to break free the containment bag will still remain intact. Referring to FIG. 5, there is illustrated a containment system 10 including a containment bag 28 made of a netting comprising a fabric material that is configured to be attached to a radome 20 by and an attachment system that includes a battens assembly 19. The battens assembly 19 includes a plurality of battens 23, 24, 25, 26, 27. FIG. 5 also shows the alignment of the containment fabric 28 with the radome 20 and the batten assembly 19. FIG. 5 also shows the radome 20 have larger attachment holes 7 for attaching the fabric to the plurality of battens 23, 24, 25, 26, 27 nested among smaller attachment holes 70 for attaching the radome to the radome attachment ring.

According to the aspects of the containment system, the containment bag 28 is a netting that is made of a fabric with a weave "hole size" small enough so that no objects greater than 5 pounds to 8 pounds go through the holes and large enough to provide the containment bag that will allow sufficient flexibility for forming to the inside surface of the radome 20.

The Applicants considered various materials that could be used for the containment bag fabric to accomplish the above design constraints. Referring to Table I, there is listed some of the materials considered. After considering such materials, it was determined that using a layer of woven Spectra fabric was an ideal solution to the above noted design constraints. In particular, the containment netting 28 can be made from a 0.01 thick Spectra Fiber weave. As will be discussed in further detail below, applicants testing of the Spectra Fiber weaver revealed that the Spectra fiber had a strength of 1100 lbs per linear inch.

Referring now to FIG. 6, there is illustrated the Spectra fiber containment fabric 28 laid on the inside of the radome 20. As can be seen, the Spectra fabric sheet conforms well to the inside surface of the radome. With the Spectra fabric 28 and the attachment system, the applicants designed an attachment system to attach the netting to the fuselage to meet the above and herein noted constraints/properties.

Once the material is conformed to the shape of the structure it is reinforcing, a attachment member is aligned to the fabric material. The attachment member can be, for example, a batten, a long, flat strip of wood, a composite, or a metal used to hold something in place or as a fastening against a wall or even a plate. According to one embodiment a plurality of battens are used to transfer mechanical load out of the fabric, and into a radome attachment structure such as radome attachment ring or plate. The thermoplastic material is then installed with the material wrapping around the batten and back upon itself for installation. According to one embodiment, the material is then clamped in place around the batten and stitched in a manner that the stitching is not the critical failure path. In order to remain homogenous, the stitching is typically the same material as the fabric used. According to aspects of one embodiment, the material was double stitched to a flexible mechanical attachment (battens) with high tensile fiber.

According to one embodiment, in order to hold the fabric in place against the rigid surface of the radome an elastomer, high strain polymer or resin is used. According to aspects of one embodiment, a low durometer is preferred to promote plastic deformation, as opposed to brittle deformation to discourage delamination, but is not necessary. According to aspect of one embodiment, the resin in combination with the fiber is chosen such that the resin fails against the radome surface or the fiber by more than an order of magnitude relative to the radome surface internal failure. This ensures that the containment system will remain out of the working space below the radome structure. However, in a catastrophic event that causes the radome structure to break apart, the containment system and the containment fabric peels away from the radome surface and contains any external subassembly components from escaping the encapsulating fiber netting material.

One advantage of the high strain resin or elastomer in combination with the thermoplastic fiber netting is that it enables the containment fiber material to deform to specific point loads and/or flex with any aerodynamic loads in order to retain its strength in the event of utilization.

Thus one aspect of the containment system is that is a homogenous fabric which is bonded to the radome by an adhesive that holds the fabric in all operational conditions but fails in the event of a fracture. Aspects of at least one embodiment of the system are that the containment system can take a 6000 lb impact load and handle a 2000 lb drag load.

One embodiment of the disclosure includes a process used to bond an oriented polymeric fabric such as Spectra, Innegra or Kevlar in place with an elastomer or non-rigid polymer system, so as to fully encapsulate the fibers causing failure loads equivalent to neat resin. This would cause the homogenous material to tear at 10-20 lbs per inch.

Referring to FIG. 7, there is shown a radome attachment ring 18 that is used to attach the radome 20 to the fuselage of the plane. Applicants designed an attachment system that would attach the containment netting 28 to the attachment ring 18 so that the containment system 10, the radome 20, and the radome attachment ring 18 can be reworked on the aircraft without removal of the radome ring 18, so that there is no need for additional mounting points of the containment system through the skin of the aircraft, and so there is no need to modify this part of the aircraft. Referring to FIG. 8, there is illustrated the battens assembly 19 including the battens 23-27, with some of the battens 24, 26-27 shown in red. In particular, applicants designed an attachment system that includes the battens assembly 19, including separate battens 23-27 that attach to the radome attachment ring 18 on the inside of the radome attachment ring. With this arrangement, the containment system constitutes a completely separate load path than the radome-to-ring attachment assembly. One aspect of the separate battens 23-27 of attachment system is that the battens allow the spectra fabric netting 28 to be wrapped around and sewn around the battens. The design of using multiple battens to secure the containment netting 28 to the radome attachment ring reduces the possibility of a tear in the netting, and makes assembly of the containment system easier.

Referring to FIG. 9, there is illustrated close view of a batten attachment to the inside of the radome ring 16, and referring to FIG. 10A, there is illustrated an exterior view from the outside of the radome of the batten attachment to the radome ring 16 through the radome. In particular, the battens are secured by a screw 3 that threads through an aperture 7 nested among the apertures in the radome 20 an through an aperture 6 in the radome attachment ring (See FIG. 8) to secure the battens to the inside of the ring 18 with clip 2, washer 4 and locknut 5. Referring again to FIG. 9, it is shown that the top part 17 of the battens 23-27, that the containment netting is sewn around, is offset from the attachment ring 18 by a certain height. Referring now to FIG. 10B, applicants came up with the use of nut plates 12 to be used with flat head screw 29, spacer 22, and nut 21 to secure the netting 28 sewn around the battens 23-27 to the radome through an aperture 8 in the radome. FIG. 10B illustrates batten alignment fastener 8 used to keep the battens in alignment during shipment and installation. According to one embodiment, there are two or three such alignment fasteners per batten section. According to an embodiment, the alignment fasteners are designed not to be mechanically significant at operational loads.

Referring to FIG. 12, there is illustrated a perspective view of the radome 20 having a plurality of apertures (1-73) for attaching the radome 20 to the radome attachment ring, additional apertures (1A-30A) for attaching the mechanical fasteners for fastening the battens to the radome attachment ring, and apertures for the batten alignment fasteners (1B-10B). According to aspects of one embodiment, the attachment system has eight attachment points in the front and back of the radome to hold 6000 lbs due to the likelihood of an object impacting the system. According to aspects of one embodiment, a total of at least 30 mechanical attachments points can was used. According to aspects of one embodiment, alignment fasteners are used for aligning the battens.

Referring to FIG. 11 there is shown a picture of the attachment system 16 include the radome 20, the netting 28, a portion of a batten 23, screw 3 threaded through an aperture (1A-30A) in the radome 20 and through an aperture 6 in the ring 18 (See FIG. 8) to secure the battens to the inside of the ring with a nut plate assembly including a clip 2, washer 4, locknut 5, as well as the nut 21 attached to flat head screw 29 (not shown), which secures the netting to the spacer 22 (not shown), and nut plate 12 (not shown). It is appreciated that the use of battens that are spaced off and batten alignment fasteners (1B-10B) allows for a blind assembly of the parts on the battens to allow for small tolerance mismatch between parts. In particular, it is appreciated that the use of the standoffs ensures that the battens are in the same place when assembling the containment system in a blind fashion. In addition, it is appreciated that with the described arrangement, the radome attachment ring joint design creates a double shear joint (tongue and groove) instead of the current single shear joint (lap joint). An analysis of the batten assembly 19 secured to the radome ring 18 revealed that a worst cast stress occurs in bending along the batten, using a worst case bending stress that was calculated using an analytical max bending equation. Through this analysis, it was determined that based on a 2000 lb. load the maximum stress is 23.2 ksi in bending, which is an FOS of 1.72; the laminate shear FOS was 9.8; the attachment tab FOS was 28.6; and the attachment fastener shear FOS was 29.8. Thus, with this arrangement, is appreciated that the battens redistribute the load of the containment system.

In addition to the battens assembly 19, the attachment system keeps the containment netting 28 secured to the inside of the radome 20 and off of the underlying external sub-system 102 (See FIG. 3). Applicants came up with a resin system for adhesion of the netting 28 to the inside of the radome 20 that has a limited peel-off force. The limited peel-off force adhesive resin makes the spectra netting formable to the inside of the radome 20 but also detachable from the radome. In particular, the limited peel-off force resin remains attached during normal operation, but detaches upon severe impact. Applicant chose a low durometer adhesive that allows for CTE mismatch between the various layers of this assembly.

As discussed above, one of the constraints on the containment system is that the RF loss of the containment system and the radome should be less than or equal to 2.0 dB over the operating frequency band, and the RF loss of the containment system itself should be less than or equal to 0.5 dB. Given such constraints on RF loss, applicants tested the RF impact of combined Spectra netting and resin system. Referring to FIG. 13, such testing revealed that a comparative RF analysis of insertion loss of Spectra on the bandwidths of interest at a normal incidence angle resulted in only negligible loss. Thus, according to aspects of one embodiment, the RF loss of the containment system is less than 0.5 dB and the RF loss of the combination of the containment system and the radome is less than 0.65 dB.

In addition, another concern of the herein described arrangement was that the batten offset height might interfere with the communication signal of interest at low elevation angles of the antenna array 106 (See FIG. 3). Referring to FIG. 14, the applicants measured the RF Insertion loss versus the relative height of offset of the batten. As can be seen, the RF insertion loss was minimal and the finalized mounting height was chosen to be 0.5 inches.

Referring to FIGS. 15-16, another constraint of the attachment system was that the batten assembly 19 not interfere with the movement of the antenna array 106 or the external sub-system, or in other words that the battens 23-27, the nut plate 12, etc. have sufficient air gap clearance from the rotation of the antenna array 106 (See FIG. 3). FIG. 16 illustrates an exploded view of the batten assembly and the air gap clearance including the antenna sweep volume 15, the batten 23, the nut plate assembly 12 and the radome ring 18. As can be seen in FIG. 15, one aspect of this embodiment of the attachment system is that it maintains sufficient air gap clearance from the antenna sweep volume so as to not interfere with movement of the antenna array 106 and the external sub-system.

Having thus described several exemplary embodiments of the system, and aspects thereof, various modifications and alterations may be apparent to those of skill in the art. For example, applicants also considered the use of a thermoformed sheet to match the inside of the radome, as well as the use of a self-supporting internal thermoformed skin. The fiber netting can also be made of other materials, such as Kevlar. Such modifications and alterations are intended to be included in this disclosure, which is for purposes of illustration only, and not intended to be limiting. The scope of the invention should be determined from proper construction of the appended claims, and their equivalents.

What is claimed is:

1. A containment system for prohibiting debris from leaving an outside surface of an aircraft in a situation where a radome covering an external sub-system that is attached to the outside surface of the aircraft is compromised and where the radome is attached to the outside surface of the aircraft by an attachment member, the containment system comprising: a flexible fabric containment bag comprising a flexible fabric netting material that is attached to an inside surface of the radome and the external sub-system such that the flexible fabric netting material covers the entire external sub-system; and an attachment system for attaching an end of the flexible fabric containment bag to the attachment member at multiple points along the end of the flexible fabric containment bag;

wherein the attachment system further comprises a limited peel-off force adhesive resin for adhesion of the flexible fabric containment bag to the inside of the radome at a plurality of distinct points so as to keep the flexible fabric containment bag from interfering with the external subsystem.

2. The containment system of claim 1, wherein the attachment system comprises a plurality of battens that attach to the attachment member.

3. The containment system of claim 2, further comprising one alignment fastener for each batten that keeps the battens in alignment during installation.

4. The containment system of claim 2, wherein the attachment member is a radome attachment ring.

5. The containment system of claim 4, wherein the plurality of battens are configured to attach to the radome attachment ring on the inside of the radome attachment ring.

6. The containment system of claim 2, wherein the end of the flexible fabric containment bag is wrapped around the plurality of battens.

7. The containment system of claim 6, wherein top part of the plurality of battens that the fabric is wrapped around is offset from the radome attachment ring by a predetermined height.

8. The containment system of claim 7, wherein the height is less than or equal to 2 inches.

9. The containment system of claim 2, further comprising a plurality of attachment fasteners, wherein each of the plurality of attachment fasteners feed through a respective aperture in the radome and through a respective aperture in the radome attachment member to secure the plurality of battens to the attachment member.

10. The containment system of claim 9, further comprising a plurality of nut plates and spacers each nut place and space further securing the plurality of battens to the radome through respective apertures in the radome.

11. The containment system of claim 1, wherein the limited peel-off force adhesive resin further provides for breaking away of the flexible fabric containment bag from the inside of the radome surface above predetermined threshold forces.

12. The containment system of claim 1, wherein the flexible fabric containment bag comprises holes that are sized to contain debris from the external sub-system.

13. The containment system of claim 1, wherein the flexible fabric containment bag comprises holes that are sized so that the fabric is flexible to be able to conform to the inside surface of the radome.

14. The containment system of claim 1, wherein the flexible fabric containment bag comprises a thermoplastic material.

15. The containment system of claim 14, wherein the flexible fabric containment bag comprises a low RF-loss, high aspect ratio polymer material selected so as to not interfere with an RF performance of the external subsystem.

16. The containment system of claim 15, wherein the flexible fabric containment bag comprises Spectra, Innegra, or Kevlar.

17. The containment system of claim 14, wherein the flexible fabric containment bag has a thickness that is less than 0.1".

18. The containment system of claim 14, wherein the flexible fabric containment bag has a strength of at least 500 lbs per linear inch.

19. The containment system of claim 1, further comprising the radome having at least one layer of a protective polymer film or a micro-layered polyester film, thereby providing an increased strength and shatter resistance radome.

20. The containment system of claim 19, wherein the at least one layer of a protective polymer film or a micro-layered polymer film is applied to an outer surface of the radome.

21. The containment system of claim 19, wherein the at least one layer of a protective polymer film or a micro-layered polymer film is at least one layer of the radome.

22. The containment system of claim 19, wherein the at least one layer of a protective polymer film or a micro-layered polymer film is applied to an inner surface of the radome.

23. The containment system of claim 19, wherein the at least one layer of a protective polyurethane film or a micro-layered polyester film comprises 3M's Ultra 600.

* * * * *